Nov. 3, 1964  J. M. KAUSS  3,155,289
APPARATUS FOR ACCURATELY MEASURED DISPENSATION OF MATERIAL
Filed Feb. 5, 1963

INVENTOR
JAMES M. KAUSS
BY *McCarthy, DePaoli & O'Brien*
ATTORNEY

3,155,289
APPARATUS FOR ACCURATELY MEASURED DISPENSATION OF MATERIAL
James M. Kauss, Dallas, Tex., assignor to F & M Scientific Corporation, a corporation of Delaware
Filed Feb. 5, 1963, Ser. No. 256,337
6 Claims. (Cl. 222—253)

The present invention relates to apparatus for accurately measured dispensation of material. It has particular application to apparatus capable of highly accurate control for measuring very small quantities of material as is required, for example, in the operation of a gas chromatograph or equipment which operates on the same general principle.

In gas chromatography small samples of material are fed into a stream of carrier gas which carries these materials through a system where the materials are selectively adsorbed and desorbed. Because various components of the sample materials are selectively desorbed and adsorbed at different rates they can be separated into micro-fractions for analysis or, on a larger scale for collection of macro-quantities. When separated on sufficiently large scale the fractions or components can be forwarded by a carrier gas to a collection system for collection of samples of purified and separate component chemicals or compositions. For efficient preparative scale work, the separated components should be collected in as large volumes as is consistent with their requisite purity.

In the past many devices have been designed for the sampling of materials which are to be fed to apparatus of this character. The operation of the gas chromatograph is such that it is often highly important that very precisely determinable samples be submitted. In analytical work, identical analyses of consecutive similar samples are dependent for their accuracy upon the samples being of identical volumes, weights or masses. For preparative scale work consecutive samples which are separated into components must be as nearly identical in size (volume) as possible so that the widths and heights of the respective chromatograph peaks will be substantially identical. It is from these peaks that particular fractions are collected by fractionating sample after sample and collecting predetermined peak area quantities of similar components from each sample.

Obviously, then, it is important to be able to feed to the apparatus repetitive samples of accurately controlled size. In analytical work the sample volumes are usually very small, frequently of the order of a very small fraction of a cubic centimeter. Samples for preparative scale separations are larger, but in either case it is desirable that the apparatus be capable of handling samples of appropriate size with accuracy.

It is particularly desirable, especially for a preparative scale chromatograph, to feed a consecutive series of samples which are, of course, larger than analytical samples but very accurately repeatable in volume. These samples are still relatively small in volume. For example, the individual sample injections may be of the order of one cubic centimeter and up to 5 or 10 cc. or even more. But even so, these quantities, though much larger than customarily used in analytical work, are relatively small for accurate machine dispensing. It has been difficult in the past to obtain or design apparatus capable of repeatedly dispensing samples of these sizes with the high accuracy required, even when dispensed in quantities as large as 10 cc. or more. To do so is a prime object of this invention.

The present invention relates particularly to an apparatus for the repetitive and accurately measured dispensation of small volume quantities, but larger than micro-analytical, of fluid material, e.g., of liquid or finely divided solids suspended in liquid, etc., which material is capable of being displaced and dispensed by a piston or equivalent means.

According to this invention, apparatus is designed and provided which comprises a measuring cylinder or dispensing compartment equipped with a dispensing piston. This piston performs alternately a refill stroke and a dispensing stroke and its extent of movement can be controlled with high and repeatable accuracy in every refill stroke. The dispensing compartment or cylinder is equipped, of course, with suitable inlet and outlet means for the material. The dispenser cylinder or base is provided with a stop means which is capable of variable but accurate and definite pre-setting. Cooperating stop means are provided on the piston.

In broader terms, a very accurately controllable cooperating stop means is supported by the cylinder or its base support in a suitable position exterior to the piston. This stop means cooperates with a stop attached to the piston. One of the stops can be set selectively in any desired position to exactly determine the stopping place of the piston on its intake or refill stroke. In this manner, the amount of material actually dispensed by the piston can be very carefully controlled and will be repeated for every stroke until changed adjustment is given one of the stop elements. In addition, matched and carefully machined cooperating stop surfaces of the piston and cylinder determine exactly the stop position of the piston on its dispensing stroke.

For actuating the piston, particularly on its refill stroke, it is preferred to use a yielding fluid force. However, any yielding force suitable for the purpose may be employed. In the present instance, it is preferred to use a pneumatically operated piston for expelling the sample and to take advantage of gas pressure already available in the chromatograph system to supply the operating force or pressure both on sample expulsion and on refill. Hence, two pistons are preferably provided, that is, one piston in the dispensing compartment or cylinder and a pneumatically operated drive piston or prime mover. These piston elements may be and preferably are closely coupled and may be machined as a single solid part. They should be rigidly connected together in any case.

Many dispensing devices of the prior art have been operated in this general manner. Many of the devices used, for example, for dispensing lubricants, automotive greases, etc., operate pneumatically and are equipped with a measuring type of dispensing piston. These actually force the lubricant such as oil or grease through a tubular line to the point to be lubricated.

However, none of the prior art devices, so far as applicant is aware, has been capable of the exact and close control which is required for feeding materials to a gas chromatograph. They have not been designed or used for this purpose. Moreover, they have not been at all capable of supplying the sample material in the small, and yet accurately measured and precisely repeatable, quantities which are required for this purpose. They have not had the wide flexibility for dispensing precise samples over a wide volume range, e.g., ranging in volume ratios up to 50:1 or more, as is required for the purposes of this invention.

Therefore, an important object of the present invention is to provide equipment which is capable of wide variation in accurately measured output from exceedingly small quantities to substantially larger quantities. Another object is to design a dispenser which is highly accurate and reliable for repeated dispensations, which is simple to operate, and which can be adjusted with exactness and with a certainty that the exact setting will be repeated for sample after sample.

The invention will be more fully understood by reference to the accompanying drawings wherein.

Figure 1:
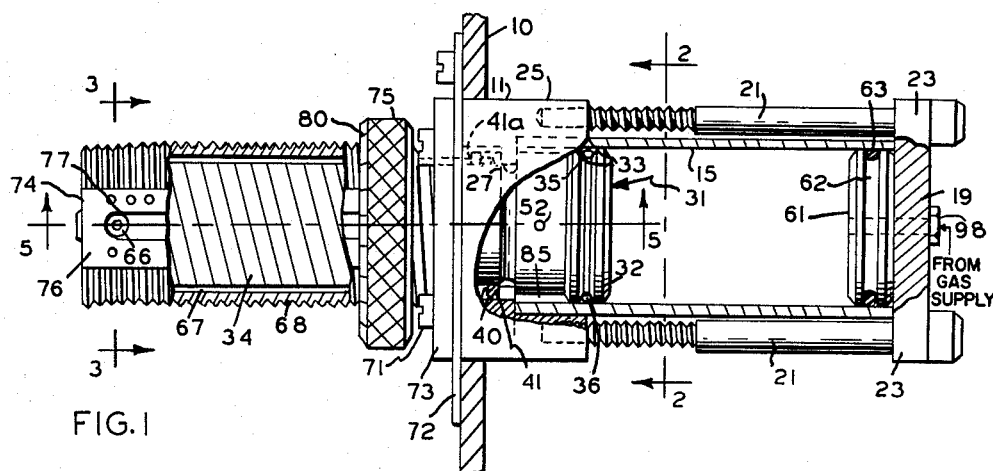
FIGURE 1 is an elevational view, largely in section, of a preferred form of apparatus for carrying out the present invention.

Referring now to FIGURE 1, the sample injection or measuring device comprises a main body member in the form of a block 11 formed of suitable metal which will not react with sample materials, e.g., of stainless steel. It is supported in an appropriate mounting 10 which may comprise a part of the framework or casing of a conventional gas chromatograph. Block 11 is bored out internally to receive on the right with a snug fit a pneumatic cylinder 15. On its outer or right end the cylinder 15 is provided with a cylinder head 19. The whole assembly of cylinder and cylinder head is secured to the block by suitable fasteners, here shown as elongated screws 21 which pass through the margin of the cylinder head as indicated at 23 and are threaded into the block at 25.

Figure 4:
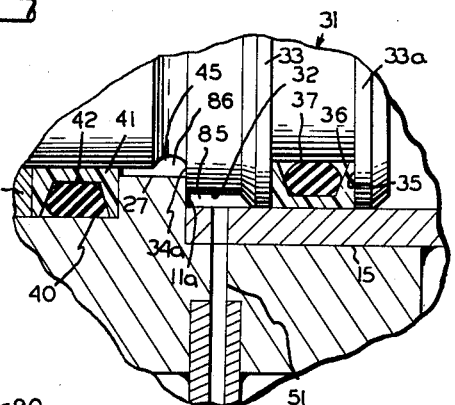
FIGURE 4 is an enlarged fragmentary view, partly in section, showing the sealing or gland assemblies which form one important aspect of the invention.
Figure 5:
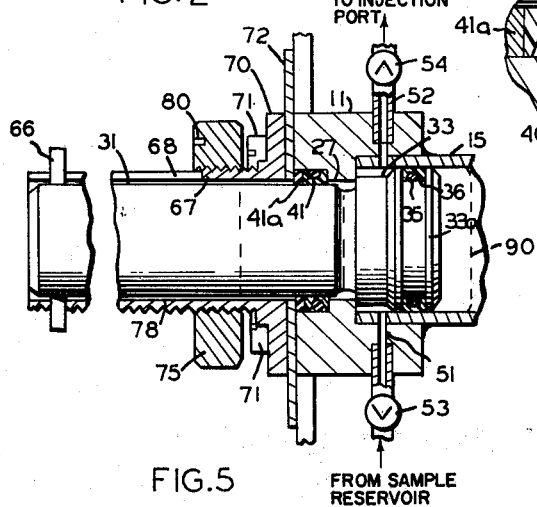
FIGURE 5 is a fragmentary horizontal sectional view, with parts omitted or cut away, taken axially of the dispensing cylinder or substantially along the line 5—5 of FIGURE 1.

Coaxially with the bore which receives the cylinder 15 the block 11 is bored to the left, beginning about its midpoint from left to right as seen in FIGURES 1 and 5, with a somewhat smaller bore indicated at 27. The arrangement is such that the cylinder 15 and the bore 27 are adapted to fit snugly with a stepped piston, indicated generally at 31. At its right end the piston 31 has the enlarged pneumatic end 32 provided with an enlarged annular portion 33 and a separable end flange or ring 33a of similar diameter. The parts 33 and 33a define a sealing ring groove 35 positioned between them. Into groove 35 is fitted a piston ring assembly or sealer 36 which is of inverted U-shape in cross section, as indicated more clearly in FIGURE 4. Sealer ring 36 preferably is formed of a hard but resilient plastic material which is inert chemically and which preferably requires no lubrication. A fluorinated hydrocarbon polymer such as the tetrafluorinated ethylene polymer made by Du Pont under the trade name Teflon is very suitable. The base of the U-shaped piston ring 36 bears firmly against the inner surface of the wall of cylinder 15, as best seen in FIGURE 4. Within the U-shaped part of the ring, and hence backing it up with a piston sealing pressure, is provided an elastic ring 37 of suitable chemically inert plastic but elastic material. An elastomer such as a halogenated rubber is preferred which may preferably be in the form of a conventional O ring. For this purpose the product "Viton," which is understood to be a fluorinated synthetic rubber, is quite satisfactory. When the parts are assembled the ring applies resilient radially outward pressure to the U-shaped piston ring, keeping it in firm sealing contact with the surface of the cylinder. This makes a gas tight and liquid tight seal for the pneumatic action of the piston.

Further to the left, block 11 is provided with an annular recess 40 adapted to receive another sealing ring 41 of similar material to ring 36. The latter also is of inverted U-shape cross section, as indicated best in FIGURE 4. This ring also is backed up and held in close sealing relation with a dispensing piston element 34, the latter being the leftward projecting part of piston 31. Sealing ring 41 is urged radially inward to contact the piston element 34 internally by means of an elastic ring, e.g., of rubber, such as an O ring 42 of the same type as the ring 37. The difference is that the latter ring 42 tends to contact the sealing ring 41 around the piston; whereas the ring 37 tends to expand the sealer 36 to keep it in close contact with the inner wall of cylinder 15. Both O rings 37 and 42 prevent leakage behind the sealing rings 36, 41. The contracting ring 41 and expanding ring 36 are of types available on the market in the United States.

The leftward projection 34 of stepped piston 31 is sized through most of its length to fit smoothly within the smaller bore 27 of block 11. Near the juncture of the elongated part 34 of smaller diameter with the larger diameter parts 32, 33, 33a the piston has an annular groove of more or less semi-circular cross section, indicated at 45. This groove is adjacent the enlarged cylindrical portion 32 which is only slightly smaller in diameter than the raised land portions 33 and 33a previously mentioned. By machining the groove 45 a clean perpendicular end or stop surface 34a is provided. This stop sets a precise limit on the leftward movement of the piston 31 as it contacts the opposing smooth annular surface 11a formed in block 11.

Block 11 is also provided with a passageway 51 for inflow of sample and a passageway 52 for outflow. The passageways are provided with appropriate valves, not shown in detail herein because they are associated usually with other apparatus. The valves, if desired, may be simple check valves and such are indicated diagrammatically at 53 and 54, respectively, for purposes of this description. The cylinder head 19 of the pneumatic chamber has an inwardly projecting boss 61 which fits within the end of cylinder 15. This boss is provided with an annular groove 62, preferably semi-circular or partly circular in cross section. Within groove 62 there is fitted a resilient sealing ring 63 which can be of rubber or the like. As shown, it also can be of conventional O ring design, although any suitable sealing gasket is appropriate at this point, provided it is made of material suitable to seal off the carrier gas which is preferably used to operate the pneumatic piston. The latter usually is an inert gas, such as nitrogen or helium, although others such as hydrogen or air may be used.

Figure 3:
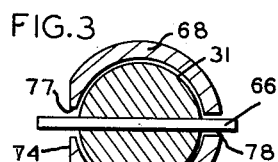
FIGURE 3 is a vertical cross-sectional view taken substantially on the line 3—3 of FIGURE 1 and looking in the direction of the arrows.

Near its extreme left end, as seen in FIGURES 1 and 5, the piston extension 34 is provided with a transversely extending stop pin, indicated at 66 in FIGURES 3 and 5. This pin serves as a stop element for the piston to limit the extent to which it can move to the right when the motive force, for example, carrier gas of the chromatograph, under pressure and applied to the sample to be dispensed, is applied to move the piston assembly to the right. If desired, the filling stroke of the dispenser piston may be actuated by other means, but gas pressure applied to the liquid which thus flows in through line 51 is preferred.

An exteriorly fitted sleeve member 68 is fitted around the piston or stud 34, being supported by block 11. It is sufficiently large internally to allow a small annular clearance space 67 between the sleeve 68 and the stud or piston element 34. This permits free movement of the piston. At its right end the sleeve 68 bears a transverse flange 70 which is secured by suitable means, such as screws 71, to the block 11. A mounting plate 72 also is preferably interposed between the flange 70 and the block 11 and by means of this mounting plate the assembly may be attached to the frame or support 10 by means of suitable screws such as 73. A compressor ring 41a, of suitable material such as aluminum, is provided to retain seal 41 in proper sealing relationship.

The sleeve 68 has its front surface, as seen in FIGURES 1 and 5, planed or flattened at 74 so as to receive indicia 76 indicating the adjustment or stop position for the piston on its refill stroke. As previously indicated, the piston bears the cross pin stop member 66. Threaded on the sleeve 68 is a micrometer screw ring 75 which is adapted to be rotated and thus moved along the sleeve to any desired position, as indicated by the scale or indicia 76 which is imposed on the flat area 74. The screw threads are sufficiently fine that the sample volume can be accurately controlled. In a specific apparatus of 12 cc. maximum sample capacity, screw threads were chosen such that one full turn of the ring screw 75 changed the volume dispensed by ½ cc. The ring has sufficient drag that it stays in adjusted position when set. The sleeve 68 is slotted on the front in the middle of its flat area 74 and also is slotted through the rear as indicated at 77, FIGURE 1 and 78, FIGURE 5, respectively. See also FIGURE 3. Hence, as the piston moves right or left, pin 66, which constitutes the piston mounted stop means, can slide along the sleeve 68 with its ends protruding through the front and rear slots of the sleeve. When the pin 66 comes into contact with the micrometer screw 75, as it moves to the right, obviously the piston 34 which carries it cannot go any farther. This constitutes the adjusted limiting refill position for the piston assembly.

Micrometer screw 75 also may be provided with detailed markings around its periphery, as indicated at 80, to show by small fractions of a turn the precise positioning of the stop elements. Thus any small fraction of a turn of the screw 75 on its threaded support can be precisely determined by the markings 80. This, in effect, constitutes a very fine micrometer screw adjustor for the refill stroke stop positioning of the dispenser piston.

The measuring chamber or dispenser cylinder capacity for the apparatus is determined by the annular spaces 85 and 86, best seen in FIGURE 4. Obviously as the piston is drawn to the right, for example, to the dotted line position indicated at 90 in FIGURE 5, the material to be sampled and analyzed is forced in, by pressure applied thereto, through line 51. It is permitted to flow inwardly by a suitable valve, here shown as the check valve 53. This material may be either a pure liquid or a liquid carrying suspended solid particle. Normally it is a material that can be vaporized and analyzed or separated in the chromatograph.

The stop position of the piston assembly, as it moves to the right under pneumatic pressure (or vacuum which may be used under some conditions if desired), is precisely determined by the setting of the micrometer screw 75 and by the contacting thereof by the stop element 66. It is obvious that the amount of material fed into the dispensing chamber of cylinder on the refill stroke can be precisely determined. As previously suggested, the material in a suitable reservoir is under pressure, preferably the pressure of the carrier gas supply when used with a gas chromatograph. Then as the piston on the succeeding half cycle is moved to the left, the material fed to the dispensing chamber will be expelled through the outlet opening 52. Suitable flow control means such as check valve 54 prevents reverse flow when the piston movement is reversed.

Figure 2:
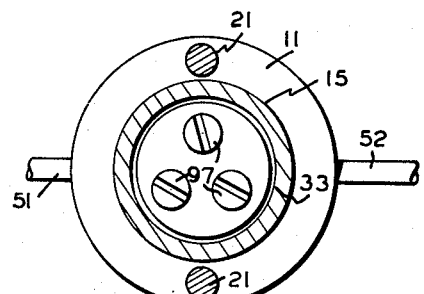
FIGURE 2 is a vertical cross-sectional view, taken substantially on the line 2—2 of FIGURE 1, and looking in the direction of the arrows.

As indicated in FIGURE 2, the end plate or ring portion 33a of the pneumatic piston is secured to the body of the piston by suitable fastening means such as the screws 97. It can be removed to replace the seal 36, 37, when necessary.

It is believed that the operation of the device will be clear from the foregoing description. To recapitulate briefly, a sample is fed, preferably forced by positive pressure applied thereto, into the measuring chamber or dispenser cylinder spaces 85, 86, surrounding the smaller stepped portion of the piston through line 51 when the piston moves to the right. Gas pressure is released or exhausted from pneumatic piston end 32 to permit this. The means for applying refilling pressure to the metering compartment 85, 86, and for applying and exhausting operating gas pressure to the cylinder 15, respectively, are not shown but may be of any suitable conventional type. The pneumatic supply source, and the exhausts too, may be connected to the cylinder head 19 in any desired manner, as at 98. The material to be dispensed fills the dispensing cylinder as the piston assembly moves to the right until the stop pin 66 contacts the left face of the micrometer screw 75 in its adjusted position. At this point the piston movement ceases, even though pressure on the inflowing liquid may continue to be applied. Now, when dispensing pressure is applied to the piston (which also may be done by mechanical means such as a coil spring if desired with appropriate valve control for dispensing), the piston assembly moves to the left. The sealing ring 36 at the right maintains a perfect seal with the interior surface of the cylinder 15 and the sample material is forced out of the measuring compartment through outlet line 52. The seal 41 surrounding the piston extension 31 prevents leakage past this point to the left. Contact of the smooth machined surfaces 34a and 11a of piston and cylinder, respectively, affords a firm and precise limit stop for the piston on its dispensing stroke.

In order to change the size of the sample dispensed, it is only necessary to change the adjustment of the ring screw 75 on its sleeve 68. Micrometer markings 76 provided along the flat surface 74 may also include actual volume markings to indicate, in cubic centimeters and fractions, for example, the amount of material actually being dispensed. The scales 76 or 80, or both, may be graduated to show smaller fractions of a cubic centimeter, if desired, depending upon the capacity and degree of precision desired of the instrument.

It will be understood that this apparatus may be made in various sizes. Such sizes may vary rather widely, depending upon the particular use intended. For high grade analytical instruments the sample should be very small. On the other hand, for a preparatory scale chromatograph in which the sample materials are collected on a relatively large scale, and for which this invention is particularly designed, the capacity will be much larger. The volume of sample dispensed can be varied widely, the ratio of minimum to maximum being as much as fifty or one hundred, or more.

It will be obvious that various modifications can be made in the apparatus described without departing from the spirit thereof. It is intended by the claims which follow to cover obvious equivalents and such modifications as would occur to those skilled in the art, as far as the prior art permits.

What is claimed is:

1. Apparatus for the repetitive and accurate dispensation of small quantities of displaceable material comprising, in combination:
   a dispensing piston having a face,
   a dispensing cylinder surrounding said piston in fluid tight relationship and equipped with inlet and outlet means for said material,
   a source of said material at a predetermined pressure connected to said dispensing cylinder,
   a cylindrical element located coaxially with respect to said piston and mounted rigidly with respect to said cylinder,
   an adjusting means mounted on said element and adapted to be adjusted along the axis of said element,
   stop means on said piston adapted to cooperate with said adjusting means to selectively limit precisely the extent of axial displacement of said piston,
   a fluid operated piston directly connected to the dispensing piston, said fluid operated piston having a face, the surface area of the fluid operated piston face exceeding that of the dispensing piston face, and
   means for applying a fluid under a pressure less than or equal to said predetermined pressure to the face of said fluid operated piston, thereby to dispense said materials from said outlet means at a pressure greater than said predetermined pressure.

2. Apparatus for repetitive and accurate dispensation of flowable material, comprising, in combination:
a fluid dispensing cylinder having inlet ond outlet means for said material,
means for supplying said material at a predetermined pressure to said inlet means,
a fluid operating cylinder rigidly connected with said dispensing cylinder,
a dispensing piston disposed in said dispensing cylinder and an operating piston disposed in said operating cylinder, said pistons each having a face and being firmly connected together for cooperating reciprocation movement in their respective cylinders, the surface area of the face of the operating piston being greater than the surface area of the face of the dispensing piston,
a stop means carried by one of said pistons,
a threaded sleeve surrounding said stop carrying piston,
an accurately adjustable positioning element threaded on said sleeve and adapted to cooperate with said stop means to selectively stop said piston at a predetermined position, thereby to control precisely the quantity of material dispensed, and
means for applying a fluid at a pressure less than or equal to said predetermined pressure to the face of said fluid operating piston in said operating cylinder, thereby to dispense said material from said outlet means at a pressure greater than said predetermined pressure.

3. Apparatus for accurately determining, controlling and dispensing samples of fluid material for a chromatographic preparatory separator or the like, comprising, in combination:
an integral pair of axially aligned cylinders, one of said cylinders being a sample dispensing cylinder having inlet means and outlet means, the other of said cylinders being a pneumatic cylinder,
a piston element having a face in each of said cylinders,
means for supplying said materials at a predetermined pressure to said inlet means, said elements being rigidly joined together to form a dispensing piston and one of said piston elements being provided with a stop means projecting out of the dispensing cylinder,
a threaded sleeve affixed to and surrounding said last mentioned piston element including said stop means,
and a micrometer screw element adjustably threaded on said sleeve and positionable with high accuracy to cooperate with said stop means and precisely limit the travel of said piston,
means for supplying a fluid at a pressure less than or equal to said predetermined pressure to said pneumatic cylinder, the surface area of the piston face in the pneumatic cylinder exceeding that of the piston in the dispensing cylinder, thereby to dispense a precisely determined quantity of said material from said outlet means at a pressure greater than said predetermined pressure.

4. Apparatus for accurately determining, controlling, and dispensing samples of fluid material into the moving phase of a chromatographic preparatory separator or the like, comprising, in combination:
an integral pair of axially aligned cylinders, one of said cylinders being a sample dispensing cylinder equipped with inlet means and outlet means, the other of said cylinders being a pneumatic cylinder,
a piston element having a face in each of said cylinders, said elements being rigidly joined together to form a dispensing piston,
means for supplying said material at a predetermined pressure to said inlet means,
adjustable means for limiting the travel of the dispensing piston thereby to vary the volume of the dispensed sample,
means for supplying a fluid at a pressure less than or equal to said predetermined pressure to said pneumatic cylinders, the surface area of the piston face in the pneumatic cylinder exceeding that of the piston face in the dispensing cylinder, thereby to dispense said material from said outlet means at a pressure greater than said predetermined pressure.

5. Combination according to claim 4 wherein the dispensing stroke is limited by accurately machined cooperating stop surfaces of said piston and said cylinder.

6. Apparatus for accurately determining, controlling, and dispensing samples of fluid material into the moving phase of a chromatographic preparatory separator or the like, comprising, in combination:
a cylinder having a central axis and a first closed end,
a piston having first and second portions of different diameter,
first and second fluid seal means for disposing the respective first and second portions of said pistons in fluid tight relationship for axial movement within said cylinder, said first portion being positioned adjacent said closed end and being greater in diameter than said second portion, said first seal means being mounted on said piston, said second seal means being mounted in said cylinder, thereby to form an annular dispensing chamber contiguous to said second portion, said dispensing chamber having an inlet means and an outlet means, said outlet means adapted to introduce the fluid material into said moving phase,
means for supplying said material under a predetermined pressure to said inlet means,
and means for supplying fluid at a pressure less than or equal to said predetermined pressure to the closed end portion of said cylinder, thereby to dispense said material into said moving phase at a pressure greater than said predetermined pressure.

References Cited by the Examiner

UNITED STATES PATENTS

| | | | |
|---|---|---|---|
| 1,493,610 | 5/24 | Darrah | 222—309 X |
| 1,687,007 | 10/28 | Cornwall et al. | 222—334 X |
| 1,984,296 | 12/34 | Witter | 222—334 X |
| 2,300,110 | 10/42 | De Hoog | 222—309 X |
| 2,501,004 | 3/50 | Reese | 222—335 X |
| 2,968,501 | 1/61 | Tisch | 277—177 |
| 3,013,591 | 12/61 | Stanley et al. | 222—335 X |

LOUIS J. DEMBO, *Primary Examiner.*